United States Patent
Ku et al.

(10) Patent No.: US 8,479,487 B2
(45) Date of Patent: Jul. 9, 2013

(54) HYBRID MULTICHANNEL POROUS STRUCTURE FOR HYDROGEN SEPARATION

(75) Inventors: Anthony Yu-Chung Ku, Rexford, NY (US); Kevin Paul McEvoy, Ballston Spa, NY (US); Patrick Daniel Willson, Latham, NY (US); Parag Parkash Kulkarni, Niskayhuna, NY (US); Roger Allen Shisler, Ballston Spa, NY (US); Anoop Muralidhara Kurup, Bangalore (IN)

(73) Assignee: General Electric Company, Niskayuna, NY (US)

( * ) Notice: Subject to any disclaimer, the term of this patent is extended or adjusted under 35 U.S.C. 154(b) by 906 days.

(21) Appl. No.: 12/538,301

(22) Filed: Aug. 10, 2009

(65) Prior Publication Data

US 2011/0030383 A1    Feb. 10, 2011

(51) Int. Cl.
*F02C 3/28*    (2006.01)
*B01D 53/22*    (2006.01)

(52) U.S. Cl.
USPC .................................. 60/39.12; 96/8; 96/11

(58) Field of Classification Search
USPC ........ 60/39.12, 39.464, 772, 780, 781; 95/55, 95/56; 96/8, 10, 11
See application file for complete search history.

(56) References Cited

U.S. PATENT DOCUMENTS

| | | | |
|---|---|---|---|
| 4,781,831 A | 11/1988 | Goldsmith | |
| 5,108,601 A | 4/1992 | Goldsmith | |
| 5,114,581 A | 5/1992 | Goldsmith et al. | |
| 5,518,624 A | 5/1996 | Filson et al. | |
| 5,702,503 A * | 12/1997 | Tse Tang | 96/13 |
| 6,126,833 A | 10/2000 | Stobbe et al. | |
| 6,695,967 B2 | 2/2004 | Bishop et al. | |
| 7,169,213 B2 | 1/2007 | Liu et al. | |
| 7,285,153 B2 | 10/2007 | Bruun et al. | |
| 7,306,642 B2 | 12/2007 | Hayward et al. | |
| 7,396,382 B2 * | 7/2008 | Ku et al. | 95/51 |
| 2005/0072304 A1 * | 4/2005 | Etievant et al. | 96/11 |
| 2005/0092683 A1 * | 5/2005 | Goldsmith | 96/11 |
| 2007/0072949 A1 * | 3/2007 | Ruud et al. | 60/775 |
| 2007/0264181 A1 | 11/2007 | Heidenreich et al. | |
| 2008/0286166 A1 | 11/2008 | Heidenreich | |
| 2009/0000480 A1 * | 1/2009 | Dardas et al. | 96/11 |
| 2010/0005969 A1 * | 1/2010 | Vanderspurt et al. | 96/10 |
| 2010/0077766 A1 * | 4/2010 | Panuccio et al. | 60/780 |
| 2010/0300114 A1 * | 12/2010 | Mhadeshwar et al. | 60/783 |

FOREIGN PATENT DOCUMENTS

WO    2009/005897 A1    1/2009

OTHER PUBLICATIONS

M. Amelio et al., "Integrated gasification gas combined cycle plant with membrane reactors: Technological and pages economical analysis," Science Direct, Energy Conversion & Management, Elsevier, vol. 48, Jun. 20, 2007, 2680-2693.*

* cited by examiner

*Primary Examiner* — Ted Kim
(74) *Attorney, Agent, or Firm* — Francis T. Coppa

(57) ABSTRACT

A hybrid multichannel porous structure for processing between two fluid streams of different compositions includes a housing and one or more structures disposed within the cavity of the housing in a shell and tube configuration. Each structure includes a body made of a porous, inorganic material and a plurality of channels for processing an optional sweep stream. Each channel is coated with a membrane layer. A feed stream introduced into the housing is in direct contact with the structures such that a gas selectively permeates through the body and into the channels. The gas combines with the sweep stream to form a permeate that exits from each channel. The remaining feed stream forms a retentate that exits from the housing. The feed stream may consist of syngas containing hydrogen gas and the sweep stream may contain nitrogen gas. A power plant that incorporates the hybrid structure is disclosed.

10 Claims, 8 Drawing Sheets

HYBRID MULTICHANNEL POROUS STRUCTURE FOR HYDROGEN SEPARATION

CROSS-REFERENCE TO RELATED APPLICATIONS

This application is related to U.S. application Ser. No. 12/538,327, and U.S. application Ser. No. 12/538,268, both filed on the filing date of the present application, the contents of both of these applications is incorporated herein by reference.

BACKGROUND

The invention relates generally to processing between two fluid streams of different compositions, and particularly to a hybrid multichannel structure having a porous body with channels for separation, purification, mass transport, exchange, or other types of processing applications of process streams.

For water filtration, existing monolith structures use a cross-flow filtration configuration in which a single feed stream that enters the filtration channels of a ceramic membrane element is divided into a permeate (solution that passes through the membrane and exits transverse to the monolith flow path) and a retentate (solution that is retained by the membrane and exits parallel to the monolith flow path and is recycled back into the feed stream). Such a monolith structure 100 is shown in FIG. 5 and includes a housing 102 having a plurality of ceramic membrane monoliths 104 disposed therein. The housing 102 is typically made of 316L Stainless Steel that incorporates a standard 150# raised-face bolt flange for connecting to a standard 150# RF counter-flange. The permeate ports are standard threaded pipe connections. The ceramic membrane monoliths 104 are sealed in the housing 102 using polymeric gaskets with a choice of materials to fit specific needs.

Referring now to FIGS. 6 and 7, each monolith 104 includes a ceramic support 106 of alpha-alumina having multiple filtration channels 108 incorporated in monolithic support material. The channels 108 can vary in diameter and can be present in multiple numbers, such as the nineteen channel membrane depicted in FIG. 6. A membrane layer 110 of metal oxide coating is formed on the inside of axially oriented channels 108. The ceramic membrane monolith 104 including the ceramic support 106 with the membrane layer 110 depicted in FIG. 6 is commercially available from Pall Corporation of Deland, Fla. under the tradename MEMBRALOX®. A standard range of MEMBRALOX® membrane layers and their composition are as follows:

Microfiltration: 0.1-12 microns (μm) (Alpha Alumina)
Ultrafiltration: 20-100 nanometers (nm) (Zirconia)
Nanofiltration: 1000-5000 daltons (D) (Titania)

As a feed stream 112, such as water 114 containing particles 116, flows into the channels 108 lined with the membrane layer 110, the permeate 118 passes through the pores of the membrane layer 110 and underlying support 106 in a cross-flow or tangential flow. The retentate 120 is essentially the original feed stream 112, but now contains a higher concentration of large molecules and/or particles retained by the membrane layer 110, as shown in FIG. 7. The separation is driven by the pressure difference from one side of the membrane to the other, commonly referred to as transmembrane pressure.

The parallel flow of the feed stream, combined with the boundary layer turbulence created by the cross-flow velocity, continually sweeps away particles and other substances that would otherwise build up on the membrane surface. As a result, cross-flow filters inherently maintain high permeation rates longer than conventional dead-end filters.

As described above, the monolith structure 100 for liquid separation includes a single feed stream 112 and two output streams (the permeate 118 and the retentate 120). However, for high-temperature gas separation, it is often advantageous to use two discrete feed streams in which one of the feed streams is a sweep to keep permeate concentration low to maximize the driving force for separation. This requires two discrete flow paths in fluid communication only through the porous walls of the monolith structure. Thus, there is the need for a hybrid structure for high temperature gas separation, such as for hydrogen gas separation.

BRIEF DESCRIPTION

Briefly, one aspect of the invention, a hybrid multichannel porous structure for processing between two fluid streams of different compositions comprises a housing having a cavity, an inlet for introducing a feed stream containing a first composition into the cavity, and an outlet for discharging a retentate from the cavity; and one or more structures disposed within the cavity of the housing, each structure including a body made of a porous, inorganic material and a plurality of channels disposed in the body for processing a sweep stream containing a second composition that is introduced into each channel at one end of the body into a composition comprising the remaining sweep stream and a permeate that exits from each channel at an opposite end of the body, wherein the feed stream is in direct contact with an outer surface of each structure as the feed stream travels from the inlet to the outlet of the housing such that one or more gases in the first composition of the feed stream selectively permeate through the body and into each channel to combine with the second composition of the sweep stream to form a permeate that exits from each channel of the body, and wherein the feed stream that does not permeate through the body forms a retentate that exits from the outlet of the housing.

Another aspect of the invention, a hybrid multichannel porous structure comprises a plurality of structures in a shell, the plurality of structures comprising a porous body with a plurality of channels disposed therein, wherein the surface of the channels comprise a support layer, an intermediate layer disposed on the support layer, and a separation layer disposed on the intermediate layer, wherein a feed stream introduced into the shell is in direct contact with the plurality of structures such that a first gas contained in the feed stream selectively permeates through the porous body and into the plurality of channels such that the first gas combines with a second gas contained in a sweep stream passing through the plurality of channels, and wherein a combination of the first gas and the second gas exits the plurality of channels of the porous body as a permeate, and wherein a remainder of the first gas of the feed stream exits the shell as a retentate.

In yet another aspect of the invention, a method for separating a gas comprises:

introducing a feed stream comprising a first gas into a shell of a hybrid multichannel porous structure, the feed stream in direct contact with one or more structures disposed within the shell;

permeating the first gas of the feed stream through the one or more structures and into a plurality of channels of the one or more structures; and introducing a sweep stream comprising a second gas into the plurality of channels of the one or more structures, whereby a combination of the first gas and the second gas exits the plurality of channels of the one or more structures as a permeate, and wherein a remainder of the first gas of the feed stream exits the shell as a retentate.

In still yet another aspect of the invention, a power plant comprises a gasification unit coupled to a carbonyl sulfide hydrolysis unit to produce a syngas; a syngas cleanup section comprising a water-gas shift reactor configured to receive the syngas from the gasification unit and to produce a shifted syngas stream enriched in hydrogen; and a hybrid multichannel porous structure for separating hydrogen from the shifted syngas stream produced by the water-gas shift reactor. The structure comprises a housing having a cavity, an inlet for introducing a feed stream containing a first composition into the cavity, and an outlet for discharging a retentate from the cavity; and one or more structures disposed within the cavity of the housing. Each structure includes a body made of a porous, inorganic material and a plurality of channels disposed in the body for processing a sweep stream containing a second composition that is introduced into each channel at one end of the body into a composition comprising the remaining sweep stream and a permeate that exits from each channel at an opposite end of the body. The feed stream is in direct contact with an outer surface of each structure as the feed stream travels from the inlet to the outlet of the housing such that one or more gases in the first composition of the feed stream selectively permeate through the body and into each channel to combine with the second composition of the sweep stream to form a permeate that exits from each channel of the body. The feed stream that does not permeate through the body forms a retentate that exits from the outlet of the housing; and a combined cycle power generation unit in flow communication with the syngas cleanup section for receiving a fuel-rich stream from the syngas cleanup section to produce electricity.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
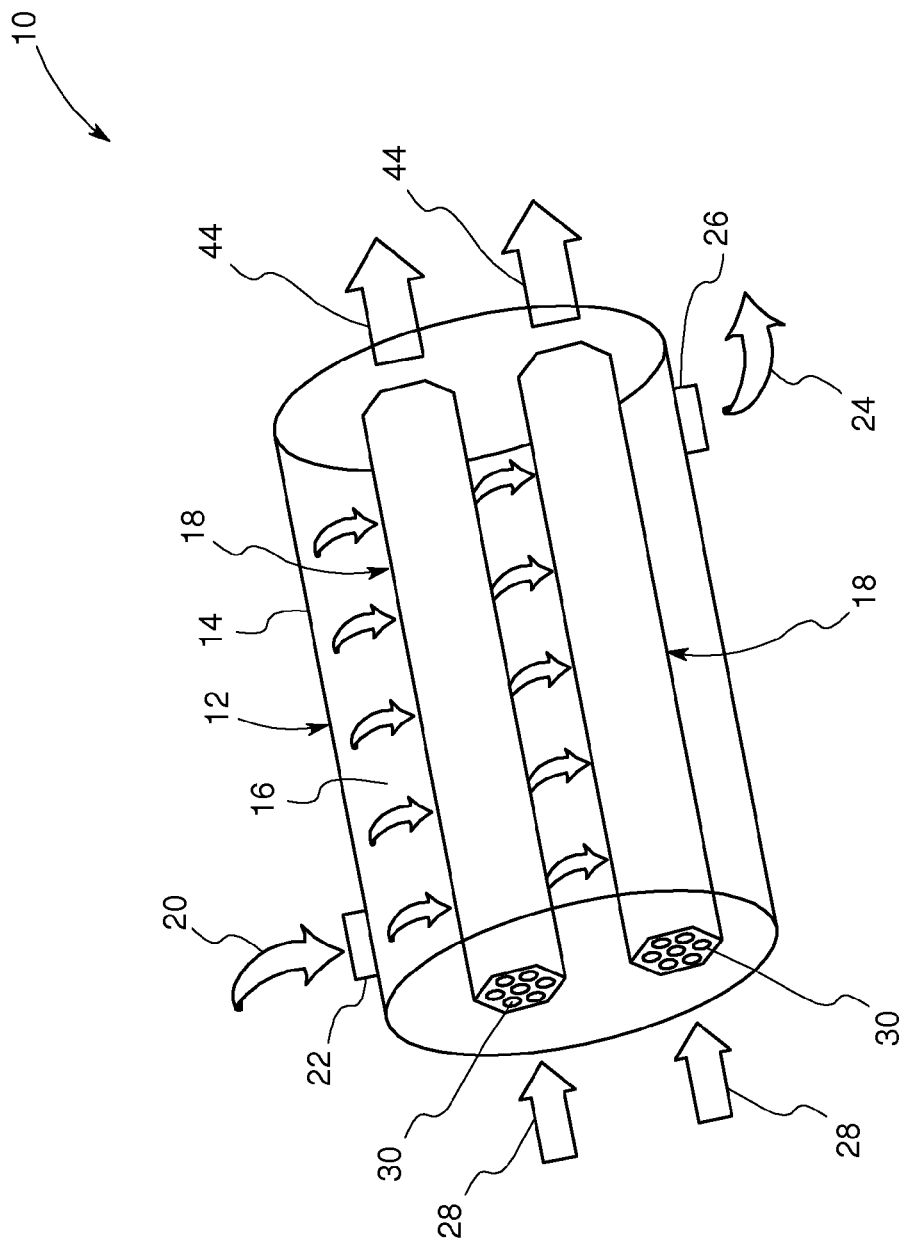
FIG. 1 is a side perspective view of a schematic representation of a hybrid structure in accordance with an embodiment of the invention.
Figure 2:
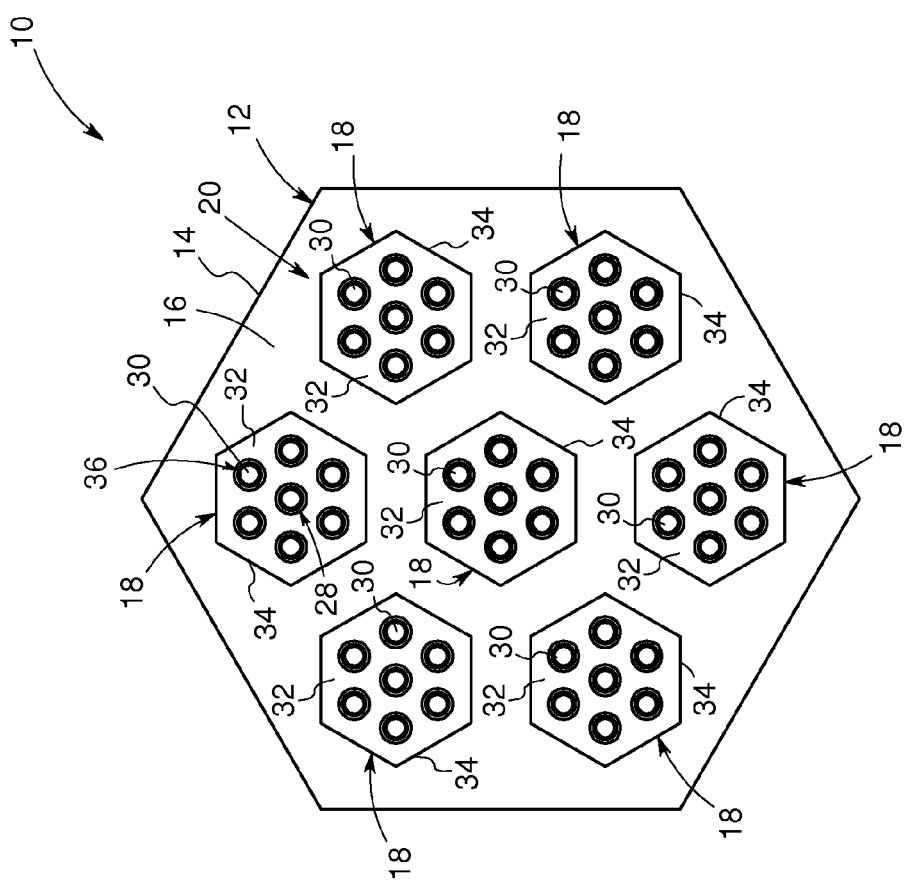
FIG. 2 is a cross-sectional view of the hybrid structure of FIG. 1.

Referring to FIGS. 1 and 2, a hybrid multichannel porous structure for gas separation is shown generally at 10 according to an embodiment of the invention. The hybrid structure 10 includes a housing 12 made of a suitable material, such as 316L Stainless Steel, and the like. The housing 12 is generally tubular having an outer surface 14 forming a cavity 16 therein. In the illustrated embodiment, the outer surface 14 is hexagonal cross-sectional shape with each side having approximately the same length. However, it will be appreciated that the invention can be practiced with other cross-sectional shapes, such as polygonal with each side having equal or non-equal lengths, circular, and the like. The housing 12 is made of a suitable material, such as 316L Stainless Steel that incorporates a standard 150# raised-face bolt flange (not shown) for connecting to a standard 150# RF counter-flange (not shown).

One or more multichannel porous ceramic membrane structures 18 are disposed within the cavity 16 of the housing 12. The ceramic membrane structures 18 are sealed in the housing 12, usually by the use of glass seals or brazes. At lower temperatures polymeric gaskets are also an option. The invention is not limited by the number of structures 18 that are disposed within the housing 12. As shown in FIG. 1, a total of two structures 18 are disposed within the housing 12, while FIG. 2 shows a total of seven structures 18 disposed within the housing 12. The structures 18 will be described in more detail below.

In general, the hybrid structure 10 has a "shell and tube" configuration in which the "shell" is the tubular housing 12 and the "tubes" are the structures 18. A first or feed stream 20 (first composition) is introduced into the housing 12 through a first inlet 22. The feed stream 20 contacts the outer surface of each structure 18 and exits at an opposite end of the housing 12 as a retentate 24 (second composition) through a first outlet 26. An optional second or sweep stream 28 (first composition) can be introduced into the channels 30 of the structures 18. The axially-oriented channels 30 can vary in diameter and can be present in any desired number, such as the seven channel structure 18 depicted in FIG. 3. A one-channel structure also can be provided as well as the seven channel structure depicted in FIG. 3. The sweep stream 28 travels through each structure 18 and exits at an opposite end of the housing 12 as the remaining sweep stream and permeate 44 (second composition).

In the illustrated embodiment, the hybrid structure 10 has a co-current flow configuration with two inlets and two outlets in which the feed stream 20 and the sweep stream 28 are introduced at the same end of the housing 12, flow in the same direction through the housing, and exit at the opposite end of the housing 12. However, it will be appreciated that the hybrid structure 10 can be configured in a counter-current flow configuration in which the feed stream 20 is introduced at an opposite end of the housing 12 as the sweep stream 28, flows through the housing 12 in an opposite direction as the sweep stream 28, and exits at the opposite end of the housing 12 as the sweep stream 28.

Figure 3:
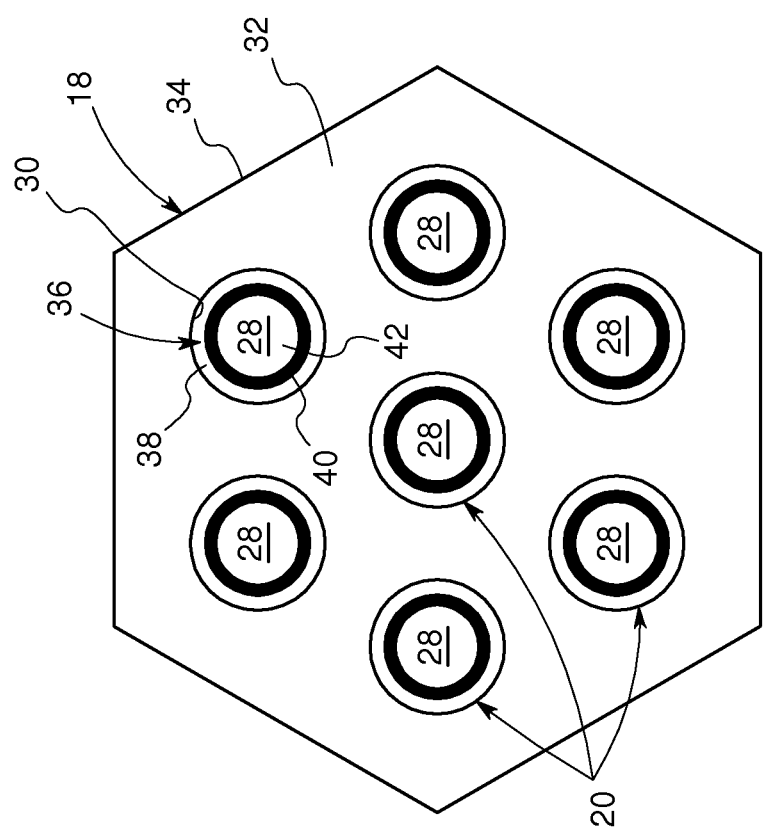
FIG. 3 is an enlarged cross-sectional view of a structure with channels coated with a membrane layer in accordance with an embodiment of the invention.
Figure 4:
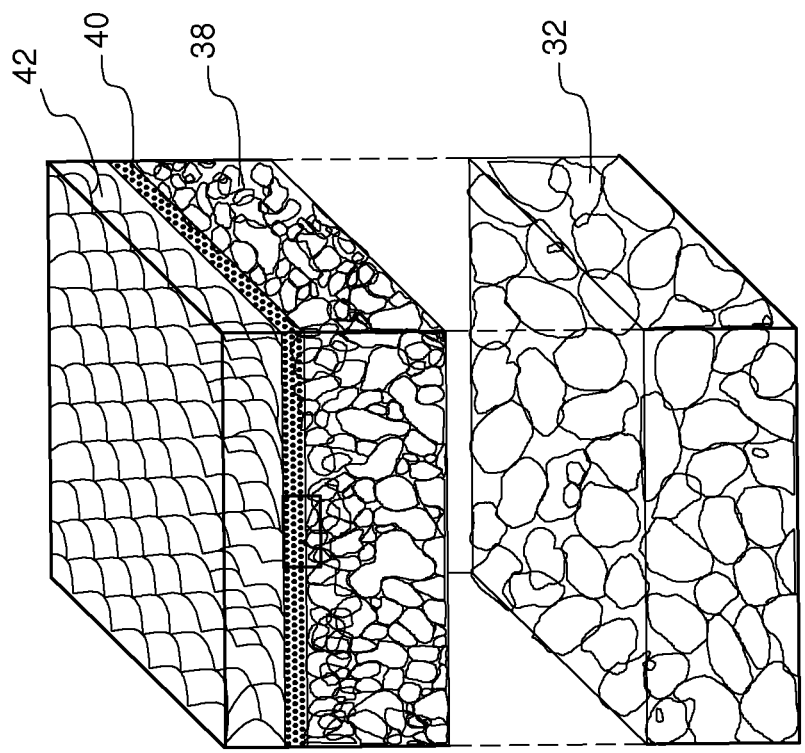
FIG. 4 is a partial cross-sectional view of the macro-porous substrate or carrier body of the structure, and the macro-porous support layer, the meso-porous intermediate layer, and the micro-porous membrane layer coating the channel of the structure.
Figure 5:
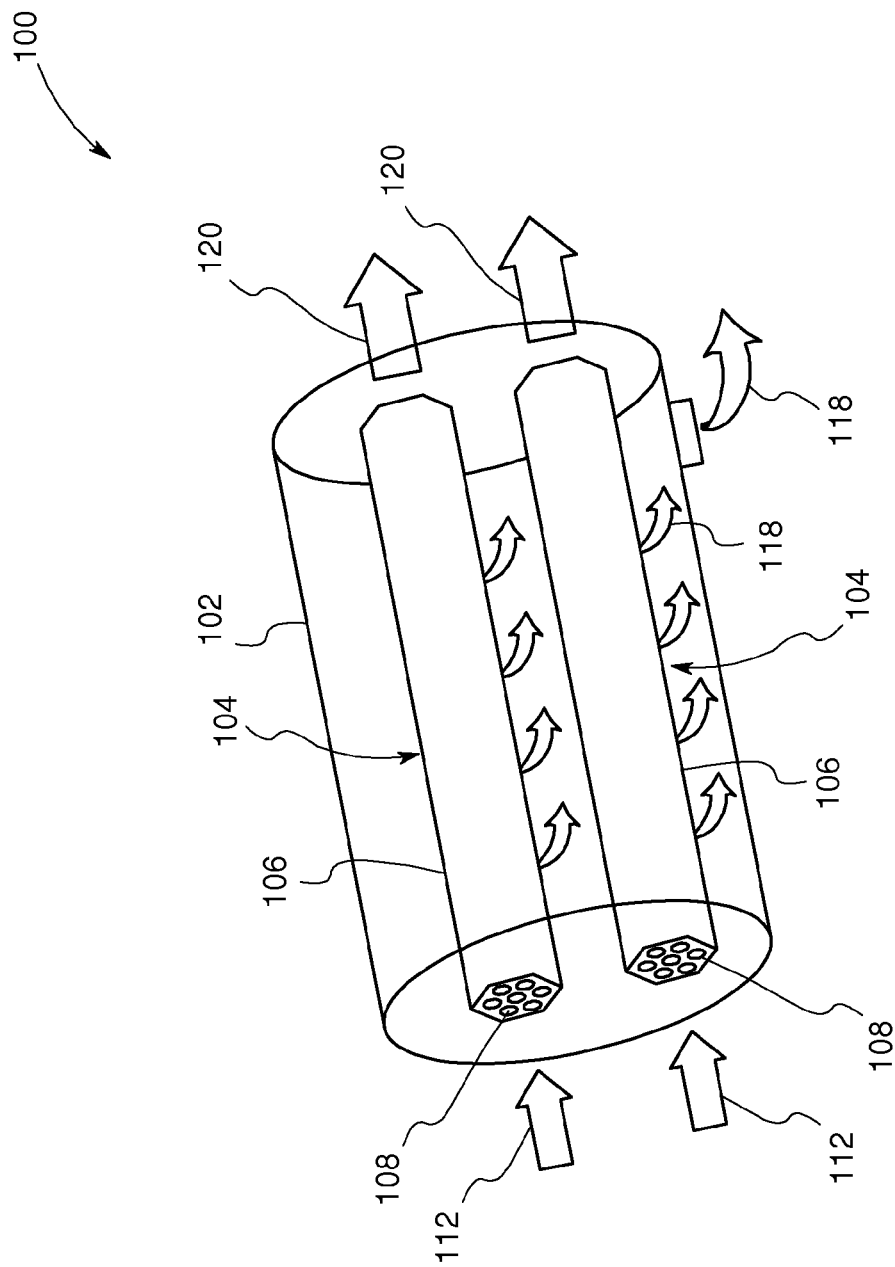
FIG. 5 is a side perspective view of a schematic representation of a conventional multi-channel structure with a membrane on a ceramic support.
Figure 6:
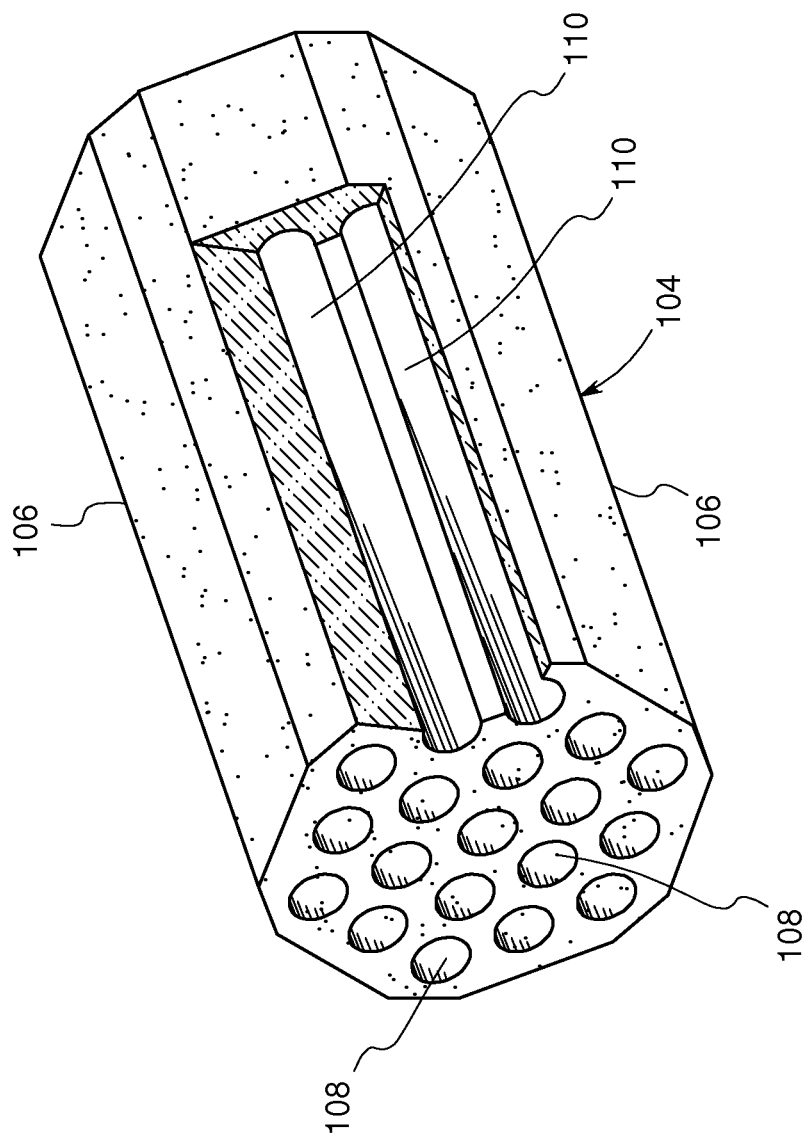
FIG. 6 is a partial cutaway, side perspective view of a schematic representation of the conventional multi-channel structure of FIG. 5.
Figure 7:
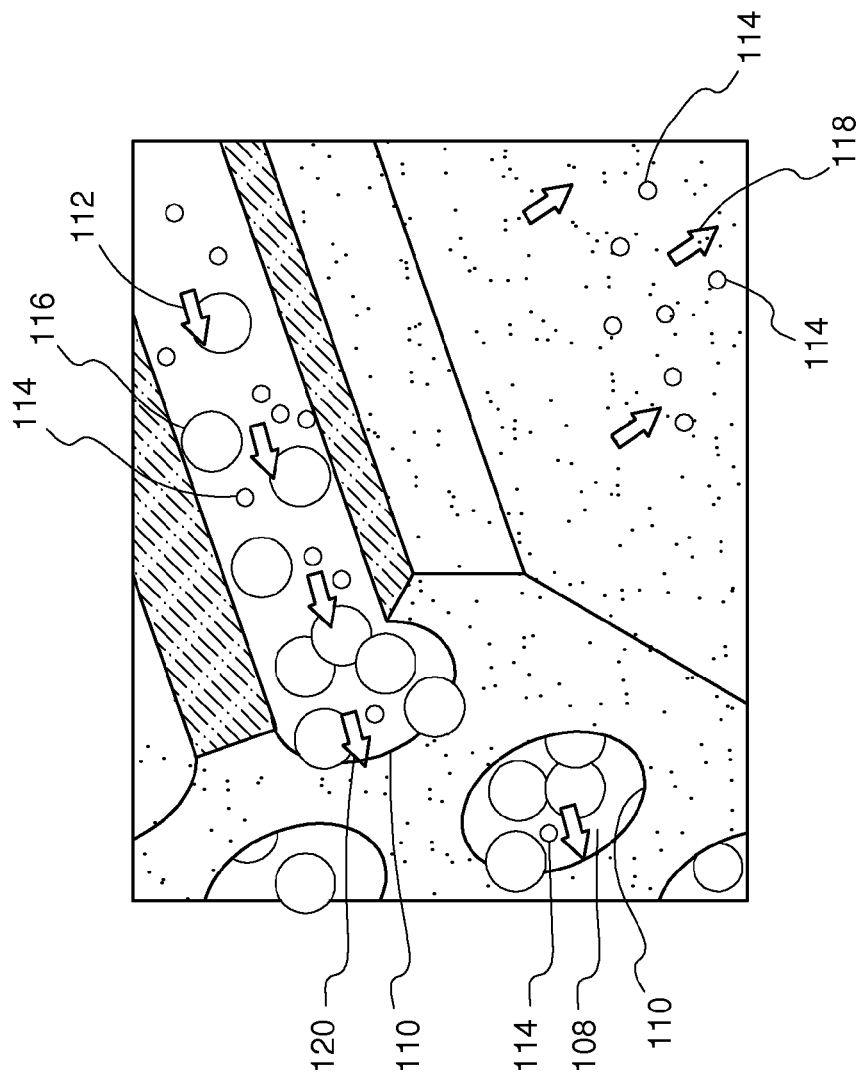
FIG. 7 is an enlarged view of a section of the membrane of FIG. 6.

Referring now to FIGS. 2-4, each structure 18 includes a macro-porous carrier substrate or body 32 with one or more axially-oriented channels 30 extending from one end of the body 32 to an opposite end of the body 32. The body 32 can be made of any suitable porous material, such as metal or any other inorganic material, having a pore size (i.e., pore diameter) between about 0.05 mm to about 2.0 mm. For example, the macro-porous body 32 can be made of a material from a member selected from the group consisting of mullite ($3Al_2O_3\text{-}2SiO_2$), alumina ($Al_2O_3$), silica ($SiO_2$), cordierite ($(Mg,Fe)_2Al_3(Si_5AlO_{18})$), silicon carbide (SiC), alumina-silica mixture, glasses, inorganic refractory and ductile metal oxides. The macro-porous body 32 may be made of other support materials, such as iron oxide, titanium oxide, zirconium oxide, zeolite (alumina/silica oxide), silicon oxide, and the like. Mullite is a metal oxide compound from $Al_2O_3+SiO_2$ with several other possible compositions with different ratios possible, as is known in material chemistry. Crystal shapes of mullite, as well as other materials in the membrane support body, can be in hollow tube, tube or needle-like forms of high aspect ratio (>5), or conventional crystal forms of low aspect ratio (0.5-5.0), or a mixture of mullite crystals of high and low aspect ratio. Common crystal phases for the alumina compound $Al_2O_3$ are gamma ($\lambda$-alumina), theta, and alpha ($\alpha$) where alpha-alumina ($\alpha$-alumina) is typically more stable than the other phases. SiC is a silicon carbide compound that is a refractory non-oxide ceramic material having good chemical and physical stability. VYCOR® glass, available from Corning Incorporated could also be used as the material for the structure 18.

In one embodiment, the macro-porous body 32 is made of alpha-alumina ($\alpha$-alumina) that allows one or more gases in the feed stream 20 to selectively permeate through the macro-porous body 32 and into each channel 30 of the structures 18. For example, the macro-porous body 32 may allow hydrogen gas from the feed stream 20 to selectively permeate therethrough and into each channel 30.

For illustration purposes only, each structure 18 has an outer surface 34 with a hexagonal cross-sectional shape to maximize the surface area that is in direct contact with the feed stream 20. It will be appreciated that the invention is not limited by the cross-sectional shape of the structure 18, and that the invention can be practiced with other cross-sectional shapes, such as polygonal with each side having equal or non-equal lengths, circular, and the like. It should be noted that the hexagonal nature of the monolith structure is not relevant to the gas separation capabilities of the invention (as opposed to conventional liquid filtration capabilities). This is because the resistance of the support structure 18 is sufficiently low that the sweep gas stream 20 does not even "see" the support structure 18, but instead the sweep gas stream 20 only "sees" the gas selective layer 42 (the layers 38 and 40 are necessary to produce a defect-free gas selective layer 42).

In the illustrated embodiment, each channel 30 is substantially circular in cross-sectional shape with any desired diameter. For example, the channel 30 can be about 3, 4, 6, or 7 mm in diameter. In addition, the channel shape could be in other shapes that are continuous with no sharp corners, such as a polygonal shape, and the like. Even if the channels are shaped in squares, the channel shape may be modified through a subsequent coating process.

If needed, a membrane layer of porous materials, shown generally at 36, having smaller pore sizes than the macro-porous body 32 may be coated onto the wall of the channels 32. The membrane layer 36 may have three functions: (1) modify the shape and wall texture of the channel 30, such as, pore size, surface smoothness, etc., (2) strengthen the macro-porous body 32, and (3) enhance the membrane deposition efficiency and adhesion.

In one embodiment, the membrane layer 36 is preferably made of a sintered zirconium oxide optionally with yttrium oxide as a stabilizer. Other metal oxide particles that can be employed as the membrane layer in the invention, either singly or in mixtures thereof, include sintered zirconia or alpha-alumina (alpha-alumina for applications requiring nominal pore sizes of the membrane of about 0.2 micron and above) or other sintered metal oxides that provide the characteristics that are capable of withstanding aggressive and extreme pH levels of alkaline or acid or strong chemical oxidants, such as syngas at elevated temperatures.

As shown in FIG. 4, the membrane layer 36 comprises a first, macro-porous layer 38 having a pore size of between about 10 µm to about 2.0 mm and a thickness of about 1.5 mm to about 2.0 mm is deposited on the inner surface of the channel 30.

A second, meso-porous intermediate layer 40 having a pore size in a range between about 100 nm to about 5 µm and a thickness of about 20 micrometers to 100 micrometers is disposed on the first, macro-porous layer 38. The intermediate layer 40 is preferably a member selected from the group consisting of alumina, silica, mullite, glass, zirconia, and a mixture thereof, with special preferences to alumina and silica. The intermediate layer 40 may be applied by the wet chemistry method, such as the sol-gel process.

Optionally, a third, micro-porous layer or gas selective layer 42 providing the separation function in the molecular size level has a pore size in a range between about 10 nm to about 1 µm and a thickness of less than 100 micrometers is deposited on the meso-porous intermediate layer 40. In one example, the micro-porous layer 42 allows selective transport or permeation of hydrogen gas traveling through the porous body 32 into the channel 30. The micro-porous layer 42 can be a dense layer, such as palladium (Pd), a palladium-alloy, such as Pd—Ag, or Pd—Cu, or a non-metallic dense layer that allows permeation of certain gases in a mixture, such as hydrogen. For particular applications, the micro-porous layer 42 can be made of zeolite, zirconia, alumina, silica, titania, mixed metal oxides, or glass. It will be appreciated that the above ranges for pore size and thickness of the membrane layer 36 are exemplary in nature and various pore sizes and thicknesses can be used. The multichannel support structure 18 protects the micro-porous layer 42 from particulates and other impurities Optionally, a fourth, shift catalyst layer (not shown) may be disposed on the outside of the multichannel structure, 104. The shift catalyst layer can convert CO into $CO_2$ and $H_2$. The shift catalyst layer may comprise a noble metal or a combination of CuO and ZnO supported on alumina or a similar structure.

In another embodiment, the meso-porous layer 40 can be deposited directly on the inner surface of the channel 30, and the micro-porous layer or gas selective layer 42 is deposited on the meso-porous layer 40. In this embodiment, the macro-porous layer 38 is omitted.

It will be noted that the relative permeance of gas through the structure 18 is substantially proportional to the pore size. Thus, the macro-porous carrier or body 32 has the highest relative permeance and the micro-porous layer 42 has the lowest relative permeance. It should also be noted that pore size and porosity are numbers that can be quantified with accepted measurement methods and models. The pore size and porosity is typically measured by standardized techniques, such as mercury porosimetry and nitrogen adsorption. The pore size (i.e. pore diameter) is calculated with well-accepted equations. There are all possible shapes for the pore size. The calculated pore size is a number to characterize the opening (width) of these pores based on well-accepted model equations. For example, gas permeability can be calculated from the following:

$$\mu = \frac{d^2}{32}P$$

where d is pore size, P is the porosity. It is noted that the equation applies to "viscous flow", and that a different functional dependence may be needed to describe Knudsen diffusion in which pore sizes are in the range between about 2 nm and about 200 nm.

In one application of the hybrid structure 10 of the invention (FIG. 1), the feed stream 20 comprises high pressure syngas (first composition) with hydrogen gas that is in direct contact with the outer surface 34 of the structures 18 (FIG. 2). The porous body 32 of each structure 18 selectively allows the syngas to contact the microporous layer 42 in a cross-flow or tangential flow and into the channels 30. The permeance of the microporous layer 42 is lower than the permeance of all of the other components of the multichannel structure 18, 32, 36, 40. In one embodiment, the optional sweep stream 28 (first composition) traveling through the channels 30 may contain a gas, such as nitrogen, and the like, that combines with the hydrogen gas to form a $N_2/H_2$ gas composition as the sweep stream 28 travels through and exits the channels 30 at the opposite end of the structure 10. The feed stream 20 that is now significantly depleted of hydrogen gas exits through the outlet 26 as the retentate 24 (second composition) on the opposite end of the structure 10.

Figure 8:
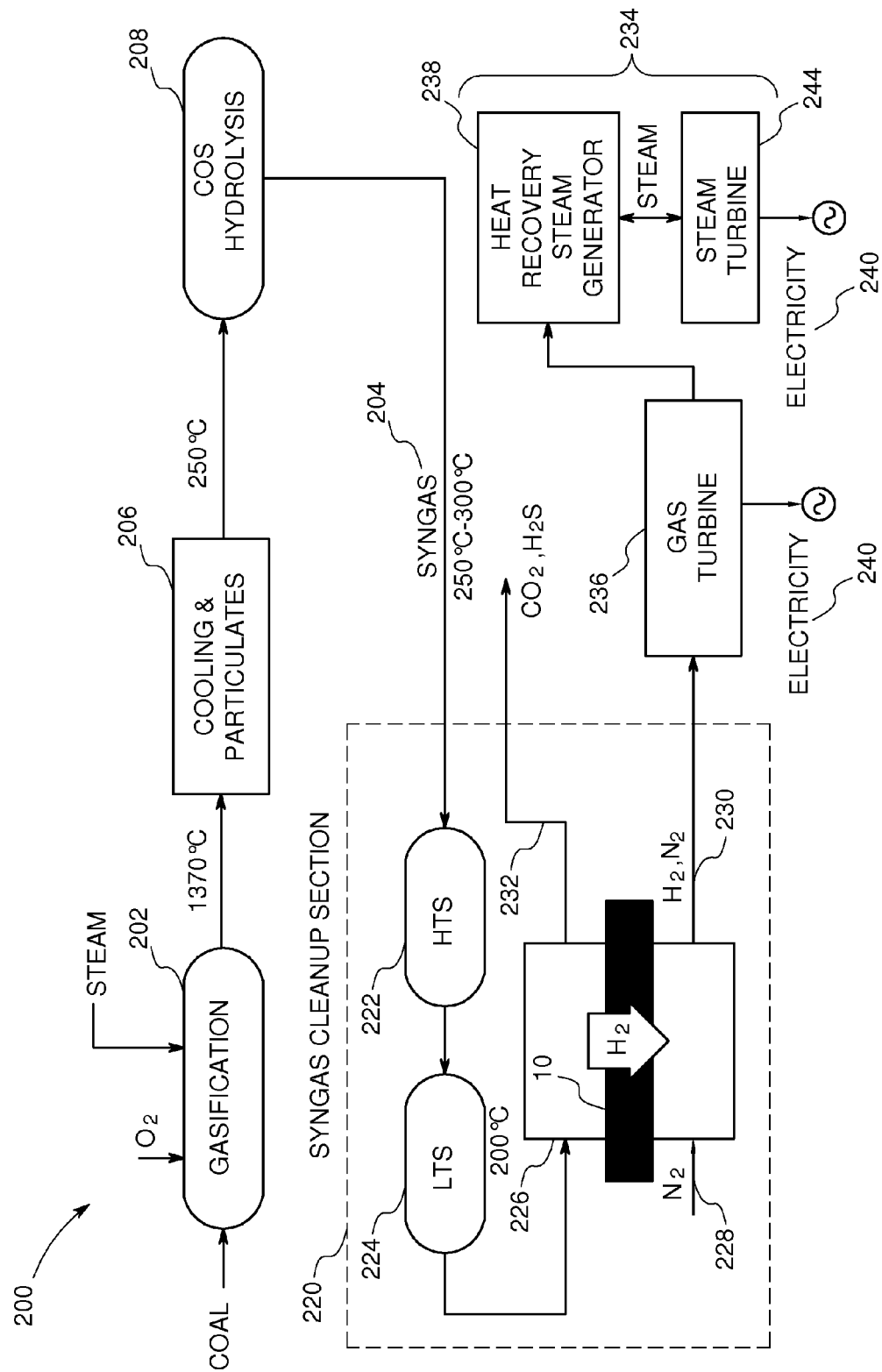
FIG. 8 is a schematic view of an exemplary integrated gasification combined cycle (IGCC) power plant including a syngas clean-up section incorporating the hybrid structure of the invention.

Referring now to FIG. 8, a schematic view of an exemplary integrated gasification combined cycle (IGCC) power plant 200 for hydrogen gas ($H_2$) and electricity production with carbon dioxide ($CO_2$) separation. The power plant 200 includes a gasification unit 202 that receives coal, oxygen containing material, and high temperature steam or water therein and produces a syngas 204. The gasification unit 202 is in flow communication with a series of syngas coolers 206 configured to remove heat and particulates and with a carbonyl sulfide (COS) hydrolysis unit 208 that is configured to convert COS to hydrogen sulfide ($H_2S$) in the syngas 204. The syngas 204 is then processed through a syngas clean-up section 220 according to the invention.

In the exemplary embodiment, the clean-up section 220 includes a plurality of individual unit operations including a high-temperature shift (HTS) reactor 222, a low-temperature shift (LTS) reactor 224. The HTS 222 includes a catalyst optimized for high temperature (about 300-400° C.) operation and the LTS 224 includes a catalyst optimized for low temperature (about 200° C.) operation. The syngas clean-up section 220 also includes and a membrane module 226 that includes the hybrid structure 10 of the invention to continuously remove the $H_2$ produced in the HTS reactor 222 and the LTS reactor 224.

During operation, in the exemplary embodiment, $H_2$ passes through the hybrid structure 10 of the invention. A high-pressure sweep gas 228, such as $N_2$, and the like, is introduced to membrane module 226 to remove $H_2$ through a stream 230, which is depleted in $CO_2$ and $H_2S$. The $CO_2$ and $H_2S$ that is produced by the HTS reactor 222 and the LTS reactor 224 that exits the membrane module 226 in a stream 232 can be processed by a $H_2S$ separation unit (not shown) and a $CO_2$ recovery unit (not shown). The $H_2S$ can be typically removed using either a physical or a chemical absorption process in the $H_2S$ separation unit. The $H_2S$ removal processes requires the use of solvents, such as Selexol, which are regenerated in a solvent regeneration unit (not shown) and elemental sulfur (S) is produced. The gas exiting the $H_2S$ separation unit enters the $CO_2$ recovery unit, where the $CO_2$ is removed by using a solvent similar to one used in the $H_2S$ separation unit. The stream 230 of $H_2$ is used by a combined cycle power generation unit 234, which includes a gas turbine 136 and a heat recovery steam generator 238 and a steam turbine 244 to produce electricity 240.

As described above, the hybrid multichannel porous structure 10 of the invention provides a high surface to volume ratio that can be manufactured at a relatively low cost. In addition, the hybrid structure 10 can be easily scaled in size to meet the design requirements of a specific application.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A hybrid multichannel porous structure for processing between two gas streams of different compositions, the structure comprising:
   a housing having a cavity, an inlet for introducing a feed stream containing a first composition into the cavity, and an outlet for discharging a retentate from the cavity; and
   one or more structures disposed within the cavity of the housing, each structure including a body made of a porous, inorganic material and a plurality of channels disposed in the body for processing a sweep stream containing a second composition that is introduced into each channel at one end of the body into a composition comprising the remaining sweep stream and a permeate that exits from each channel at an opposite end of the body,
   wherein the feed stream is in direct contact with an outer surface of each structure as the feed stream travels from the inlet to the outlet of the housing such that one or more gases in the first composition of the feed stream selectively permeate through the body and into each channel to combine with the second composition of the sweep stream to form a permeate that exits from each channel of the body,
   wherein the feed stream that does not permeate through the body forms a retentate that exits from the outlet of the housing, and
   wherein each channel is coated with a membrane layer comprising a first, macro-porous layer disposed on a surface of each channel, a second, meso-porous intermediate layer disposed on the first, macro-porous layer, and a third, micro-porous layer disposed on the second, meso-porous intermediate layer, and wherein the membrane layer selectively separates a gas contained in the first composition of the feed stream, and wherein the separated gas permeates through the body of each structure and combines with the second composition of the sweep stream traveling through each channel of the body.

2. The hybrid structure of claim 1, wherein the first composition of the feed stream comprises syngas containing hydrogen gas, and wherein the second composition of the sweep stream comprises nitrogen gas, and wherein the hydrogen gas contained in the feed stream permeates through the body of each structure and combines with the nitrogen gas of the sweep stream traveling through each channel of the body.

3. The hybrid structure of claim 1, wherein the feed stream is introduced at one end of the housing, and wherein the sweep stream is introduced at the same end of the housing in a co-current flow configuration.

4. The hybrid structure of claim 1, wherein the feed stream is introduced at one end of the housing, and wherein the sweep stream is introduced at an opposite end of the housing in a counter-current flow configuration.

5. A hybrid multichannel porous structure for processing between two gas streams of different compositions, the structure comprising:
a housing having a cavity, an inlet for introducing a feed stream containing a first composition into the cavity, and an outlet for discharging a retentate from the cavity; and
one or more structures disposed within the cavity of the housing, each structure including a body made of a porous, inorganic material and a plurality of channels disposed in the body for processing a sweep stream containing a second composition that is introduced into each channel at one end of the body into a composition comprising the remaining sweep stream and a permeate that exits from each channel at an opposite end of the body,
wherein the feed stream is in direct contact with an outer surface of each structure as the feed stream travels from the inlet to the outlet of the housing such that one or more gases in the first composition of the feed stream selectively permeate through the body and into each channel to combine with the second composition of the sweep stream to form a permeate that exits from each channel of the body,
wherein the feed stream that does not permeate through the body forms a retentate that exits from the outlet of the housing, and
wherein each channel is coated with a membrane layer comprising a meso-porous layer disposed on a surface of each channel, and a micro-porous layer disposed on the meso-porous layer, and wherein the membrane layer selectively separates a gas contained in the first composition of the feed stream, and wherein the separated gas permeates through the body of each structure and combines with the second composition of the sweep stream traveling through each channel of the body.

6. The hybrid structure of claim 5, wherein the feed stream is introduced at one end of the housing, and wherein the sweep stream is introduced at the same end of the housing in a co-current flow configuration.

7. The hybrid structure of claim 5, wherein the feed stream is introduced at one end of the housing, and wherein the sweep stream is introduced at an opposite end of the housing in a counter-current flow configuration.

8. A power plant, comprising:
a gasification unit for producing a syngas;
a syngas cleanup section, comprising:
a water-gas shift reactor configured to receive the syngas from the gasification unit and to produce a shifted syngas stream enriched in hydrogen; and
a hybrid multichannel porous structure for separating hydrogen from the shifted syngas stream produced by the water-gas shift reactor, the structure comprising a housing having a cavity, an inlet for introducing a feed stream containing a first composition into the cavity, and an outlet for discharging a retentate from the cavity; and one or more structures disposed within the cavity of the housing, each structure including a body made of a porous, inorganic material and a plurality of channels disposed in the body for processing a sweep stream containing a second composition that is introduced into each channel at one end of the body into a composition comprising the remaining sweep stream and a permeate that exits from each channel at an opposite end of the body, wherein the feed stream is in direct contact with an outer surface of each structure as the feed stream travels from the inlet to the outlet of the housing such that one or more gases in the first composition of the feed stream selectively permeate through the body and into each channel to combine with the second composition of the sweep stream to form the permeate that exits from each channel of the body, wherein the feed stream that does not permeate through the body forms the retentate that exits from the outlet of the housing, and wherein each channel is coated with a membrane layer comprising a first, macro-porous layer disposed on a surface of each channel, a second, meso-porous intermediate layer disposed on the first, macro-porous layer, and a third, micro-porous layer disposed on the second, meso-porous intermediate layer, and wherein the membrane layer selectively separates a gas contained in the first composition of the feed stream, and wherein the separated gas permeates through the body of each structure and combines with the second composition of the sweep stream traveling through each channel of the body; and
a combined cycle power generation unit in flow communication with the syngas cleanup section for receiving a fuel-rich stream from the syngas cleanup section to produce electricity.

9. The power plant of claim 8, wherein the feed stream is introduced at one end of the housing, and wherein the sweep stream is introduced at the same end of the housing in a co-current flow configuration.

10. The power plant of claim 8, wherein the feed stream is introduced at one end of the housing, and wherein the sweep stream is introduced at an opposite end of the housing in a counter-current flow configuration.

* * * * *